United States Patent
Suryanarayana et al.

(10) Patent No.: US 11,340,684 B2
(45) Date of Patent: May 24, 2022

(54) SYSTEM AND METHOD FOR PREDICTIVE BATTERY POWER MANAGEMENT

(71) Applicant: DELL PRODUCTS, LP, Round Rock, TX (US)

(72) Inventors: Shekar Babu Suryanarayana, Bangalore (IN); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 62 days.

(21) Appl. No.: 16/894,070

(22) Filed: Jun. 5, 2020

(65) Prior Publication Data
US 2021/0382539 A1 Dec. 9, 2021

(51) Int. Cl.
| | |
|---|---|
| *G06F 1/32* | (2019.01) |
| *G06F 1/3212* | (2019.01) |
| *G06F 11/34* | (2006.01) |
| *G06F 8/65* | (2018.01) |
| *G06F 1/3287* | (2019.01) |

(52) U.S. Cl.
CPC .......... *G06F 1/3212* (2013.01); *G06F 1/3287* (2013.01); *G06F 8/65* (2013.01); *G06F 11/3495* (2013.01)

(58) Field of Classification Search
None
See application file for complete search history.

(56) References Cited

U.S. PATENT DOCUMENTS

| | | | |
|---|---|---|---|
| 8,129,946 B2 | 3/2012 | Wang et al. | |
| 2003/0135705 A1* | 7/2003 | Montero | H01M 10/4257 711/163 |
| 2004/0187134 A1* | 9/2004 | Suzuki | G06F 1/3203 718/102 |
| 2005/0240786 A1* | 10/2005 | Ranganathan | G06F 1/3287 713/320 |
| 2008/0201587 A1* | 8/2008 | Lee | G06F 1/329 713/320 |
| 2013/0219203 A1* | 8/2013 | Fujisaki | G06F 1/3212 713/323 |
| 2013/0254564 A1 | 9/2013 | Chueh et al. | |
| 2015/0256004 A1 | 9/2015 | Miller et al. | |
| 2016/0116974 A1* | 4/2016 | Ginnela | G06F 9/4401 713/2 |

(Continued)

*Primary Examiner* — Danny Chan
(74) *Attorney, Agent, or Firm* — Larson Newman, LLP

(57) ABSTRACT

An information handling system includes an embedded controller to capture a current battery power level of a battery that is a sole source of power of the information handling system. A service module may update a configuration table with anticipated power consumption associated with a component of the information handling system, wherein the anticipated power consumption is based on an operation, and predict whether the current battery power level is sufficient to complete the operation, including comparing the current battery power level with the anticipated power consumption of the component. If the current battery power level is sufficient to complete the operation, then the service module may execute the operation. If the current battery power level is insufficient to complete the operation, then the service module may provide one or more options associated with the operation based on a power management policy.

20 Claims, 3 Drawing Sheets

(56) References Cited

U.S. PATENT DOCUMENTS

| | | | |
|---|---|---|---|
| 2016/0132065 A1* | 5/2016 | Sultenfuss | G06F 1/3265 |
| | | | 700/295 |
| 2016/0259649 A1* | 9/2016 | Poornachandran | G06F 1/3203 |
| 2016/0294197 A1 | 10/2016 | Thompson et al. | |
| 2019/0041950 A1* | 2/2019 | Chynoweth | G06F 12/1027 |
| 2019/0073012 A1 | 3/2019 | Sultenfuss et al. | |
| 2019/0095220 A1* | 3/2019 | Iyengar | G06F 9/4881 |
| 2019/0369699 A1* | 12/2019 | Pathak | G06F 11/3409 |
| 2019/0377644 A1 | 12/2019 | Kulkarni et al. | |
| 2020/0233984 A1* | 7/2020 | Kalenderidis | G06F 21/85 |
| 2020/0301492 A1* | 9/2020 | Regupathy | G06F 21/572 |
| 2021/0034452 A1* | 2/2021 | Tan | G06F 9/4401 |

\* cited by examiner

SYSTEM AND METHOD FOR PREDICTIVE BATTERY POWER MANAGEMENT

FIELD OF THE DISCLOSURE

The present disclosure generally relates to information handling systems, and more particularly relates to predictive battery power management.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes an embedded controller to capture a current battery power level of a battery that is a sole source of power of the information handling system. A service module may update a configuration table with anticipated power consumption associated with a component of the information handling system, wherein the anticipated power consumption is based on an operation, and predict whether the current battery power level is sufficient to complete the operation, including comparing the current battery power level with the anticipated power consumption of the component. If the current battery power level is sufficient to complete the operation, then the service module may execute the operation. If the current battery power level is insufficient to complete the operation, then the service module may provide one or more options associated with the operation based on a power management policy.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
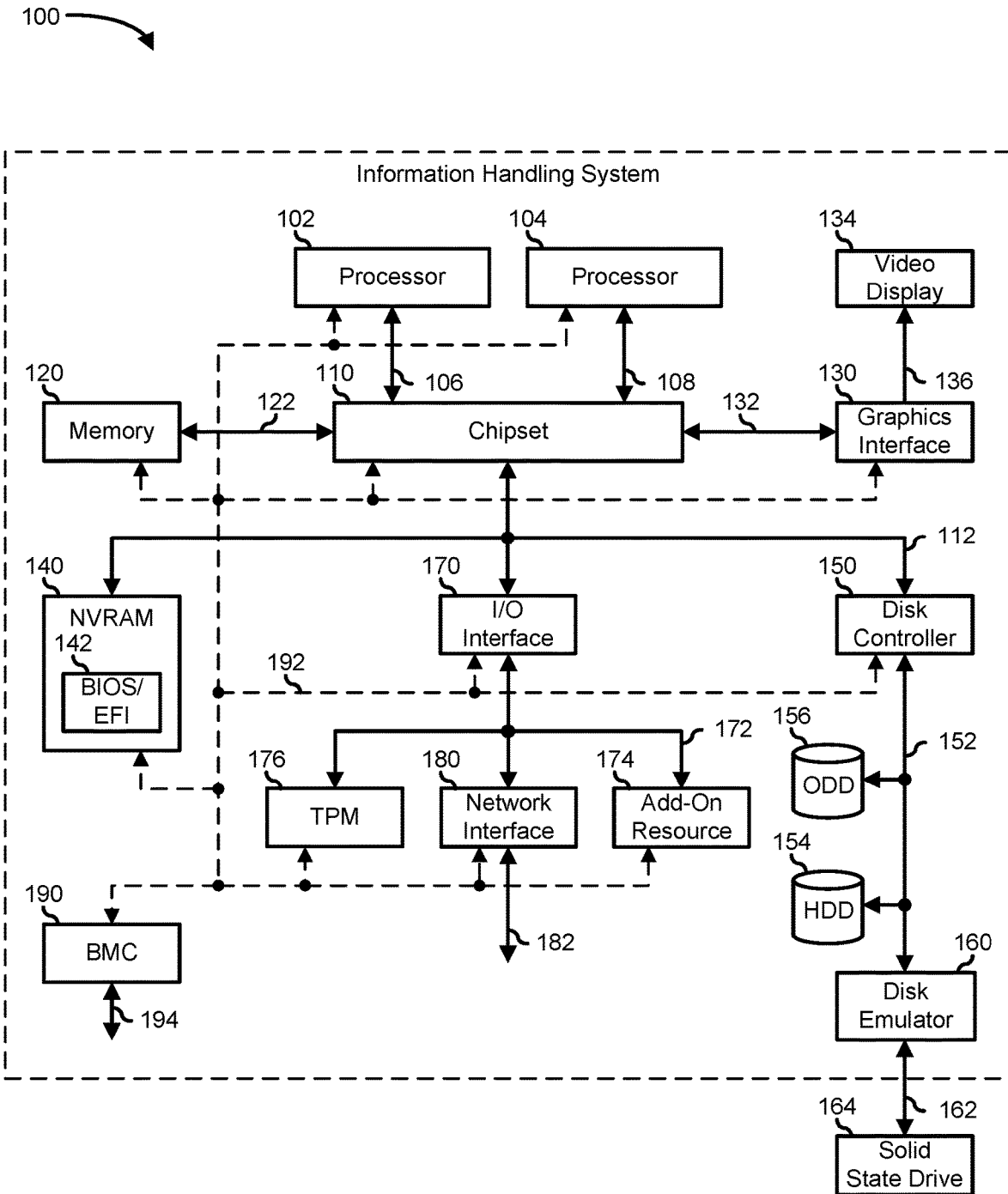
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190 also referred to as an embedded controller. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

An information handling system may experience a catastrophic failure and even corruption when performing a procedure such a diagnostic or remediation procedure with limited battery capacity, wherein the battery is the sole source of power of the information handling system. Because a user may not have information whether the battery capacity is sufficient to successfully perform the procedure without interruption, the information handling system may run out of power during the procedure causing the catastrophic failure. Generally, when performing diagnostic or remediation procedures, all of the devices of the information handling system are enabled and are expected to consume full power, increasing demand from the battery. In addition, use of a graphical user interface may require more power as compared to a command-line interface. If the battery power is drained while performing the procedure, then the procedure may fail and corrupt the information handling system. For example, if the battery power is drained during a critical file update.

In another example, a battery firmware may have issues charging the battery resulting in a mandatory firmware update to re-enable the battery firmware to function properly. However, performing a battery firmware recovery procedure may drain the battery and corrupt the information handling system resulting in boot failure. Also, users may not be aware of the need or availability of sufficient battery capacity when attempting a procedure which leads to the procedure draining the battery during the procedure may result in battery drainage during the procedure which may result in corruption of the information handling system as aforementioned.

The present disclosure may manage the performance of the battery especially during low battery power level to ensure that a procedure may finish uninterrupted. Thus, avoiding a catastrophic failure or corruption of the information handling system. To accomplish the aforementioned, the current disclosure monitors the battery performance and anticipated power consumption of various devices for the procedure. A prediction is made based on a power management policy and actions taken accordingly.

Monitoring the battery performance includes collecting data associated with a battery such as the battery availability, battery power level and battery charge status. In addition, the collected data may be compared with a known list of operations and anticipated power consumption rates of the devices associated with the operations. The comparison may be performed according to a power management policy which may dynamically apply one or more restrictions based on the comparison. For example, the power management policy may apply restrictions to various user functions or reduce capabilities of an operation to be performed. The present disclosure may run an algorithm to determine the power consumption matrix of the various devices of the information handling system and publishes power management policy for each of the devices.

Figure 2:
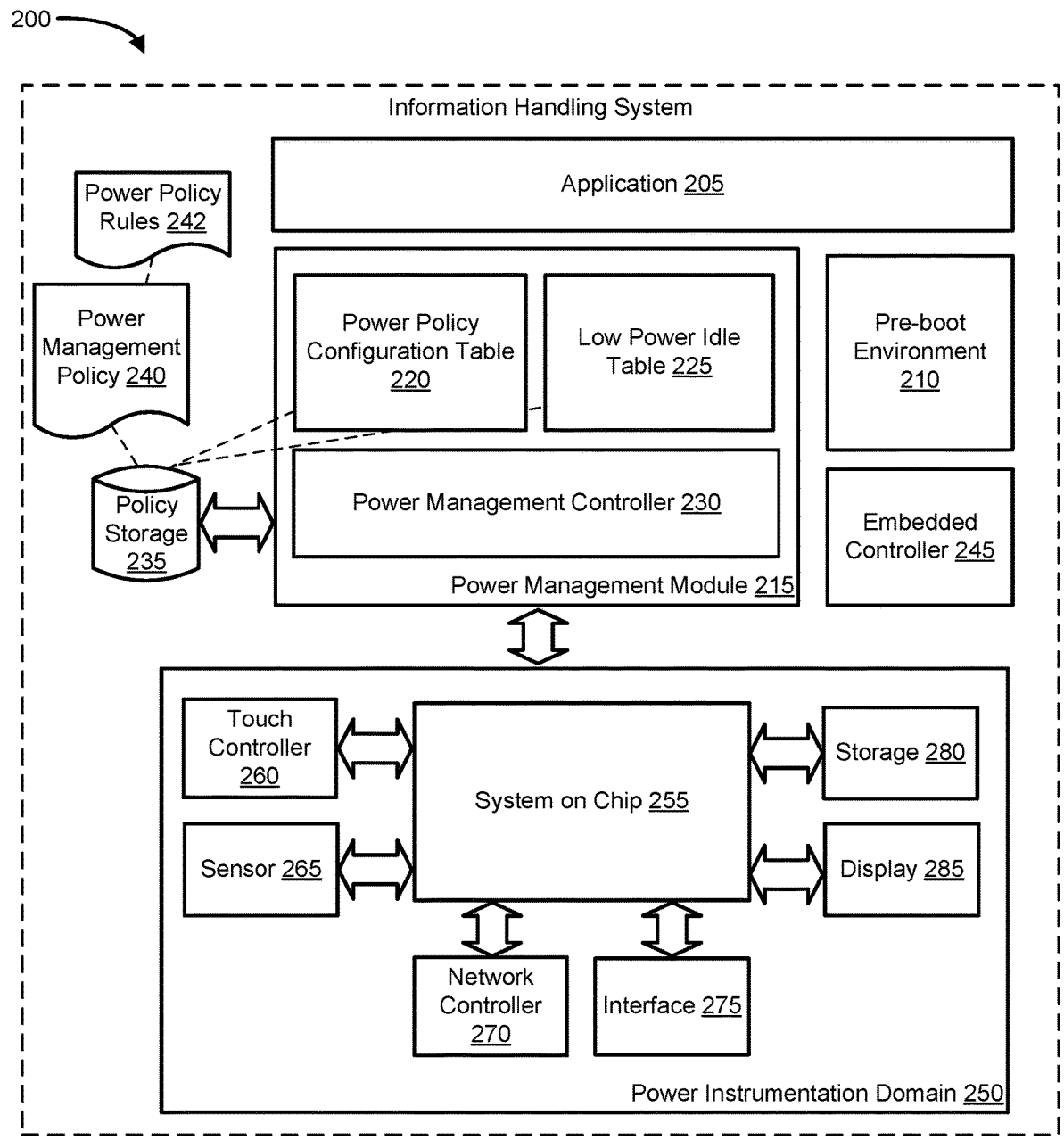
FIG. 2 is a block diagram illustrating an example of a system for predictive battery power management, according to an embodiment of the present disclosure.

FIG. 2 shows an example of system 200 for a predictive battery power management. System 200, which is similar to information handling system 100 of FIG. 1, may include an application 205, a pre-boot environment 210, a power management module 215, a policy storage 235, a power management policy 240, an embedded controller 245, and a power instrumentation domain 250.

System 200 may be configured to support multiple power states for its devices also referred to as components. The power states may correspond to the power states defined in the Advanced Configuration and Power Interface (ACPI) specification. For example, in a working state, the device is fully usable. However, in a different state, such as a low-power state, the device may not be fully usable. The information handling system can save power by switching the device into a low-power state rom the working state when not in use.

Power instrumentation domain 250 includes instrumented devices that may be managed by power management module 215 and capable of operating in a low-power state. In particular, power instrumentation domain 250 includes a system on chip 255, a touch controller 260, a sensor 265, a network controller 270, an interface 275, a storage 280, and a display 285. System on chip 255 is may be an integrated circuit that holds one or more devices such as the central processing unit, memory, input/output ports, and a secondary storage on a single substrate. System on chip 255 may be configured to listen for an event or a notification from one or more pre-boot applications, embedded controller 245, and power management module 215 or its components such as power management controller 230. Based on the event or the notification, system on chip 255 may go into various power states such as the low-power state or a full power state. In addition, system on chip 255 may also be configured to put one or more devices of power instrumentation domain 250 into one or more power states such as low-power state or wake up the same to full power.

System on chip 255 may also be configured to measure and control the devices in power instrumentation domain 250. System on chip 255 may use sensor 265 in taking measurements such as current temperature, status, power requirement, etc. of the devices. The measurements may be stored in storage 280 and used to provide feedback to power management module 215 or power management controller 230 in particular. The power management controller 230 may then adjust the power states of the devices based on power management policy 240.

Sensor 265 may include one or more sensors such as a temperature sensor, a voltage sensor, a current sensor, a battery sensor, etc. Sensor 265 may transmit captured sensor data to system on chip 255 and/or power management controller 230. Sensor 265 may store the sensor data in storage 280. Power management controller 230 may also query sensor data from sensor 265 or storage 280.

Storage 280 may be similar to ODD 156, HDD 154, or SSD 164 of FIG. 1. While display 285 may be similar to video display 134 of FIG. 1. Touch controller 260 may include circuitry in conjunction with a touch device such as display 285 to enable input to the information handling system via touch functionality. Network controller 270 may include one or more of the following: a Wi-Fi controller, a Bluetooth controller, a global positioning system controller, etc. Interface 275 may be an interface between the battery and a power controller hub such as a power management integrated circuit (PMIC), a battery sub-system, etc.

Application 205 may be a pre-boot application under the unified extensible firmware interface (UEFI) environment. Application 205 may include an EFI shell, an EFI shell command, a flash utility, a diagnostic utility, an operating system recovery utility, a firmware update utility, etc. Pre-boot environment 210 includes a pre-boot stack wherein system 200 is controlled by the BIOS/EFI at initialization prior to an operating system taking control. Embedded controller 245, which is similar to BMC 190 of FIG. 1, may be responsible for collecting data associated with the battery such as its power level, availability, and/or charge status.

Power management module 215 may be configured to manage devices of the information handling system based on power management policy 240 by applying power policy rules 242, which may be included in power management policy 240, to ensure successful or uninterrupted operation of the pre-boot application or a subset thereof. Power management module 215 may direct power management controller 230 and/or system on chip 255 to apply power policy rules 242 or a subset thereof to a device or a set of devices in power instrumentation domain 250. Power policy rules 242 include one or more rules, algorithms, or logic that implements power management policy 240. In addition, power policy rules 242 may be implemented based power policy configuration table 220 and low-power state table 225.

Power management module 215 may be configured to put other devices or another set of devices that are not participants of application 205 to low-power state also referred to as low-power mode. Low-power state may be one of low-power states of device power states. Device power states describe the power state of a device in an information handling system, independently of other devices. In Windows®, device power states are referred to as D0, D1, D2, and D3. D0 is a full power state while D1, D2, and D3 are low-power states. D3 power state includes two sub-states: D3hot and D3cold. Device power states that are not in a full power state are in a low-power state. For example, if application 205 is a diagnostic application to be applied to storage 280, then power management module 215 may put network controller 270, display 285, and touch controller 260 in the low-power state. In addition, power management module 215 may reduce the resolution and contrast of display 285.

Power management module 215 may be configured to manage battery performance based on the power requirement of application 205. The power requirement of application 205 may be based on anticipated energy consumption also referred to as power consumption data and/or metrics of various devices. The battery performance may also be based on the current battery power level, wherein the battery is the sole power provider of system 200. The captured power consumption may be associated with a pre-boot operation also referred to as a pre-boot application such as application 205. Power management module 215 may also be configured to store the power consumption data and/or metrics in power policy configuration table 220 and/or low-power state table 225 in addition to or instead of storage 280. The energy consumption data and/or metrics may be collected before, during, or after a performance of the pre-boot application.

In yet another example, power management module 215 may also determine whether the battery firmware is capable of charging the battery of the information handling system. This is a scenario wherein the information handling system is plugged to an external power source, but the battery is not charging. A battery firmware update may be desirable to restore the charging ability of the battery firmware. Power management module 215 may put the entire platform in low-power state while performing the battery firmware update to prevent draining the battery during the firmware update which may result in the corruption of the information handling system.

Power management module 215 may generate energy demand estimation profiles based on power policy configuration table 220, power management policy 240, low-power state table 225, data/metrics collected associated with the battery power level, and power consumption of the devices in power instrumentation domain 250, etc. The energy demand estimation profiles may be statistical models of power consumption and power demand estimations. Power management policy 240 may be set by an administrator such as an information technology department of an enterprise or be automatically triggered based on the energy demand estimation profiles.

Power policy configuration table 220 may include device utilization data, such as the power consumption data, of various devices in association with a pre-boot application. The power consumption data may include the energy consumed of each device during the execution of the pre-boot application. Power policy configuration table 220 may also include power consumption metrics before or after the execution of the pre-boot application. Power policy configuration table 220 may also include information regarding the timing requirements of the pre-boot application and power consumption or usage allowances for subsets of or the entire pre-boot application. In addition, power policy configuration table 220 may include information regarding one or more thresholds associated with the power consumption of the devices. Also, power policy configuration table 220 may include information associated with the battery charge status or battery power level requirement for a subset of or the entire pre-boot application to operate. Power policy configuration table 220 may be initially transmitted to system 200 via a BIOS flash process. Power policy configuration table 220 may then be updated based on the evaluation of system behavior during the performance of the pre-boot application. Also, power management controller 230 may be configured to load power policy configuration table 220 during system boot of the information handling system.

Power management policy 240 may include one or more policies for managing battery performance and power consumption of each of the devices of the information handling system based on the current pre-boot application in operation and the current battery charge level. Power management policy 240 may be stored in policy storage 235 which may be a non-volatile memory shared between power instrumentation domain 250, power management module 215, and embedded controller 245. Power management policy 240 may have different battery charge level thresholds for each one of the pre-boot applications. For example, a battery charge level of at least 5% may be desirable for a diagnostics application. In addition, power management policy 240 may include one or more thresholds for determining whether to apply power policy rules 242 such as to operate selected devices in a low-power state. One or more thresholds associated with a set of devices may be more aggressive than other thresholds for a different set of devices. In another example, power management policy 240 may not be applied if current battery power level exceeds a specific threshold such as when the battery is in full power capacity.

Power management controller 230 may apply power management policy 240 to ensure that the pre-boot application can be performed without interruption. Power management module 215 may be configured to implement power management policy 240 when a battery power level threshold is reached. Power management policy 240 may specify how to handle the various devices of the information handling system based on the pre-boot application and the current battery charge level. For example, devices that are not part of the operation of application 205 may be placed in low-power state during the performance of application 205 to limit power consumption and save battery life. In another example, power management controller 230 may reduce the resolution and/or contrast of display 285. In addition, because the graphical user interface may consume more power than a command line interface, power management controller 230 may disable touch controller 260 and/or switch from using a graphical user interface to a command line interface also referred to as text mode of the pre-boot application. In yet another example, power management controller 230 may place one or more network devices such as network controller 270 into a network quiet mode, wherein network controller 270 is not allowed to access a network, such as a LAN, the Internet, a WAN, etc. As such, network controller 270 appears to be simply disconnected from the network.

Power management controller 230, which may be a UEFI driver or service such as a power instrumentation driver, can be configured to collect data and/or metrics such as power states from various devices like the devices in power instrumentation domain 250. For example, power management controller 230 may collect the power states of devices associated and/or not associated with application 205. In addition, power management controller 230 may collect actual the power consumption of the various devices in association with each of the pre-boot applications. Also, power management controller 230 may determine the anticipated power consumption of the devices associated with the pre-boot applications, such as based on information in low-power state table 225.

Power management controller 230 may be configured to generate and/or update a low-power state table 225 based on the collected data. Power management controller 230 may also update power policy configuration table 220 based on the collected data. Power management controller 230 may update low-power state table 225 and power policy configuration table 220 for each application and for each device that may be used for learning and re-calculations performed during a power management prediction analysis. For example, power management controller 230 may determine various factors such as power consumption of the device, how much of the device's operation context does the device retain in a particular power state, device driver behavior, device restore time, and wake-up capability. The device driver behavior includes determining an action of the device driver in restoring the device to a full power state. The device restore time includes determining the length of time to restore the device to a fully operational state. The wake-up capability includes determining whether the device can wake up from a state. In general, if a device can wake up from a given state such as D2, then the device can also wake up from a power state that is higher than the given state in this case, D1.

The aforementioned tables may be used by power management controller 230 in managing the power requirements of the devices and utilization of the battery to accommodate these power requirements. For example, prior to executing an application, power management controller 230 may determine various factors such as the devices that are associated with the application, whether the devices should operate in full power mode, or whether the devices can operate in a low-power state. Power management controller 230 may also determine the devices that are not associated with the application and put the devices in a low-power state such as in D3 cold state.

Low-power state table 225, which may be similar to low-power idle table (LPIT) of the ACPI specification, may be used to manage the power state of the devices before, during, or after the execution of the pre-boot application. For example, low-power state table 225 may be used to determine the power state of the device such as to determine whether a device has entered a low-power state and the length of time the device is in the low-power state. Power management controller 230 may set a value in a state description associated with a device when the device enters or leaves the low-power state. Low-power state table 225 may also be used to determine if a device is not included in the performance of the pre-boot application.

Low-power state table 225 may be used to monitor the power states of the devices in power instrumentation domain 250. In particular, low-power state table 225 may be used to monitor whether the devices are in a low-power state. Low-power state table 225 may include an ACPI header and one or more state descriptors. The state descriptors may include a device identifier, a timestamp, a power state, a constraint or pre-condition to be met to achieve a particular power state, etc.

Figure 3:
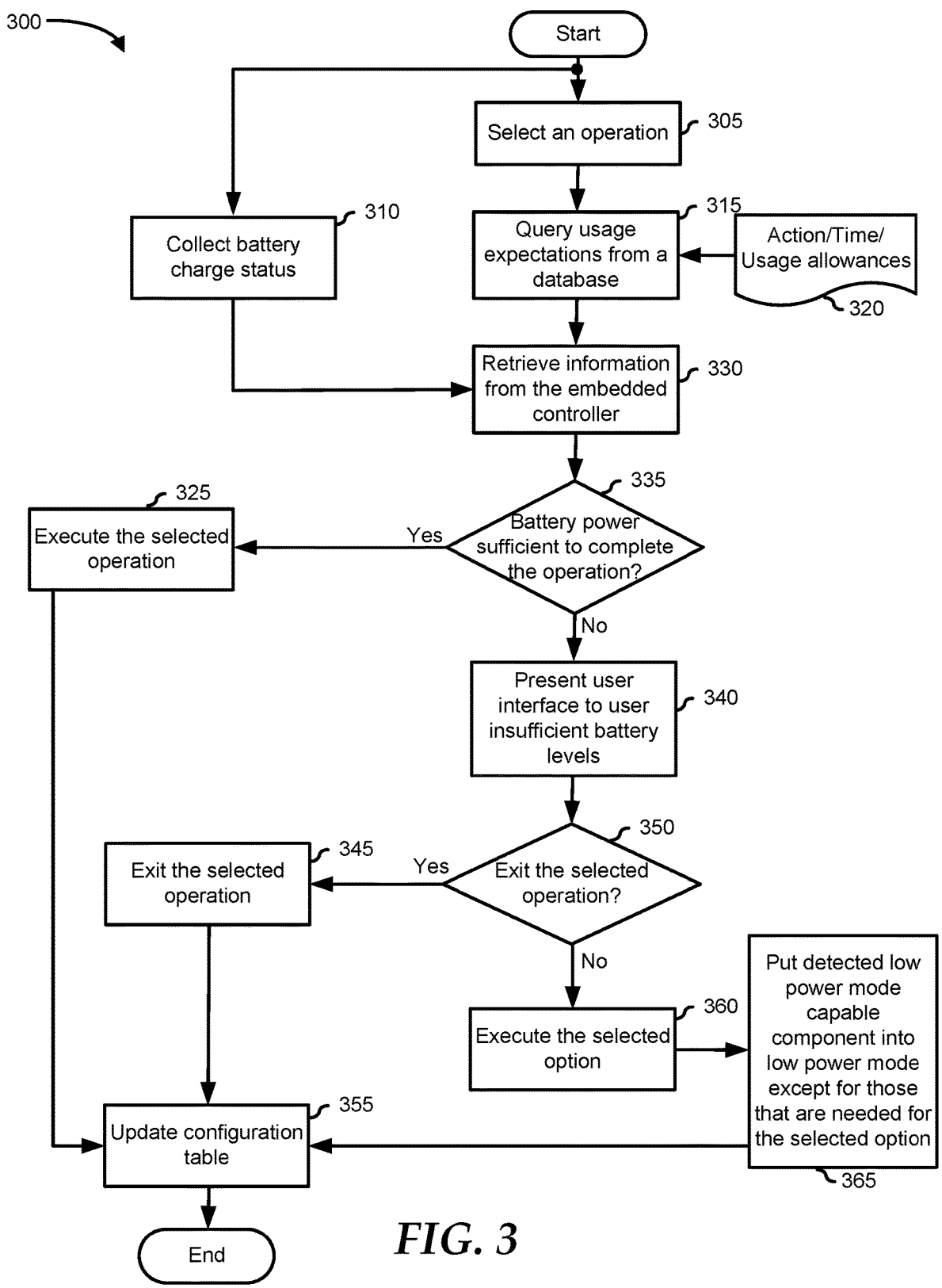
FIG. 3 is a flowchart illustrating an example of a method for predictive battery power management, according to an embodiment of the present disclosure.

FIG. 3 shows an example method 300 for a predictive battery power management. Method 300 may be performed by one or more devices of system 200 of FIG. 2. In particular, one or more blocks of method 300 may be performed by a power management service such as power management controller 230 of FIG. 2 except as otherwise specified. The power management service, or simply referred herein as a service, may be a UEFI service that may monitor and/or manage power consumption of various instrumented devices of an information handling system during a low-power charge level of the information handling system's battery, wherein the battery is the sole source of power. As part of managing the power consumption of the devices, the service may predict the energy demands of the devices based on the available battery power and/or the pre-boot application in operation.

As part of the prediction, the service may collect the battery's availability and current charge level. In addition, the service may collect the current power state of devices of the information handling system. The service may also determine whether the device is able to operate in a low-power state. The service may compare the collected data and/or metrics against known list of operations such as pre-boot applications and anticipated battery consumption rates of the devices involved. Based on the comparison, the service may also apply a power management policy may which may implement functional user restrictions or a reduction of the capabilities of operations to be performed For example, during system startup or during performance of one or more pre-boot applications a current surge tends to occur as the devices of the information handling system boot to life or powered on respectively. In order to have enough power to boot, the information handling system typically draws power from both the battery and an external power source. If the information handling system is not plugged in to an external power source and only relies on the battery, and if the battery charge is low, then there may not be enough power to perform the startup or the pre-boot application. Generally, it is desirable for a battery of an information handling system to have 3% to 5% of a battery full charge state in order for the information handling system to boot.

Upon system boot, the known list of functions and required charge status may be loaded from a configuration file or a configuration table such as power policy configuration table 220 of FIG. 2. The configuration may have been initially loaded into the information handling system via a BIOS flash process. The configuration file may be dynamically updated based on an evaluation of the information handling system's behavior during the operation of the pre-boot application. For example, if current battery power level or charge status is equal or greater than expected power consumption while performing the pre-boot application, then the method may execute the pre-boot application. If the current battery power level or charge status is less than the expected power consumption of the pre-boot application, then the service may apply power saving measure to manage the battery power level such as automated screen dimming power down of various devices based on the information handling system's behavior. The service may identify the devices involved with the current operation and put the rest of the devices in the platform into a low-power state or mode to save battery power and to ensure a successful operation. The service may also notify the user regarding the insufficient power available for the pre-boot application prior to applying the power saving measure.

Method 300 typically starts at block 305 where a user may identify an application also referred to as an operation or a task to be executed. The user may have been presented with a several applications for execution. For example, the user may be presented with an operating system recovery or a firmware update operation. A user may include an administrator, information technology personnel, a computer, a particular device, or a computer program, etc. The method proceeds to block 315.

At block 310, the method collects information associated with the battery such as battery availability, battery power level or battery charge status. The information may be collected by an embedded controller similar to embedded controller 245 of FIG. 2. The battery power level may be a close approximation of the remaining capacity of the battery and may depend on a number of factors such as the age, the number of charge/discharge cycles, the voltage level, the current consumption, the temperature, and/or other factors known in the art. In another embodiment, the battery may transmit its power level or charge status to the embedded controller. The method proceeds to block 330.

At block 315, upon identification of operation to be executed, the method may query or read one or more parameters associated with the identified operation such as usage expectations. For example, the method may query a configuration table such as power policy configuration table 220 of FIG. 2. The query may include allowances associated with the operation or action to be performed such as time and usage requirements as shown in query 320. For example, the query may determine how long the operation is expected to last and the power requirements it needs to successfully finish the operation. The method proceeds to block 330.

At block 330, the method retrieves information such as the battery power level and charge status from the embedded controller. The method may also retrieve the parameters queried at block 315. The method proceeds to decision block 335 where the method determines if the battery power level or charge status is sufficient to complete the operation. The method may compare current configuration of the information handling system and the battery power level or charge status with the expected power consumption need of the devices associated with the operation. Based on the comparison, the method may predict whether the selected operation may be successfully completed without an interruption based on a power management policy. If the battery power level or charge status is greater than or equal to the expected power consumption such as sufficient to complete the operation, then the "YES" branch is taken, and the method proceeds to block 325 where the method may execute the operation as requested or selected by the user. If the battery power level or charge status is less than the expected power consumption such as insufficient to complete the operation, then the "NO" branch is taken, and the method proceeds to block 340.

At block 340, the method may provide a user notification regarding the insufficient battery power level or charge status. For example, the method may present user with a notification warning regarding the potential running out of battery power during the operation. In addition, the method may present the user with one or more options associated with the operation. The options may include one or more of the following: to exit the operation, to perform a subset of the operation; to disable an advanced mode which may include disabling a graphical user interface and switching to a normal mode which may include command line interface or text mode instead; to disable a device that is not needed for performing the operation such as disconnecting or powering off a storage device; to put the entire platform in low-power state, wherein only a sensor is operational; and to disable devices that consume power above a threshold such as turning off backlight, disabling wireless support, disabling touch controller etc. The user may select an option from those that were presented. The method may also automatically configure runtime properties of the devices of the information handling system prior to the execution the operation, a subset of the operation, or the selected option based on the operation or a portion thereof.

The method proceeds to decision block 350, where the method determines whether to exit from the operation. If the method determines to exit the operation, then the "YES" branch is taken, and the method proceeds to block 345. If the method determines to not exit the selected operation, then the "NO" branch is taken, and the method proceeds to block 360. At block 345, the method does not perform any action associated with the operation and exits the selected operation. The method proceeds to block 355.

At block 355, the method may update the power management configuration table with data associated with the current battery power level or current charge status. The current battery power level may be the latest battery power level or latest charge status subsequent to the execution of the operation or selected option. The method may also update the power management configuration table with the actual power consumption of the devices associated with the operation or selected option that was executed. Although, referred herein as the power management configuration table, the information may be stored in other formats such as a configuration file, a configuration list, etc. The method may also update the power management configuration table regarding the option taken, for instance whether the operation was executed, partially executed, or not executed. The updated power management configuration table may be used by the service in its learning process which includes how the devices responded to the operation such as actual power consumption vs the anticipated power consumption. The service may use the learning process to update power management policy and/or power policy rules such as power policy rules 242 of FIG. 2. For example, the service may learn to choose a particular mode because based on the learning process the particular mode consumes less power than a specific mode used during the execution of the operation. The method ends.

At block 360, the method may execute the selected option. For example, the method may execute a subset of the selected operation such as to run a limited number of tests instead of the full suite of tests. In another example, the method may switch to a mode with low-power requirement such as by using a command line interface instead of a graphical user interface. In yet another example, in addition to executing the subset of the selected operation, the method may disable devices that are not required for the subset, such as disabling a wireless device or turning off the backlight.

The method proceeds to block 365 where upon completion of selected option, the method may collect data associated with the devices of the information handling system such as the current battery power level or charge status. The method may also collect data associated with the executed option, such as start time and finish time. The collected data may be used in updating the configuration file in block 355. The method then proceeds to block 355.

The present disclosure showed examples of the power management service running on a pre-boot environment such as on a UEFI system and method, the service may also be run as an operating system service after the information handling system has successfully booted. The service may manage devices when running an operating system application during a low-power level of the information handling system's battery, such as equal to or less than a specific threshold set by the user or administrator.

Although FIG. 3 shows example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, block 315 and block 330 may be performed in parallel.

In accordance with various embodiments of the present disclosure, the methods described herein may be implemented by software programs executable by a computer system. Further, in an exemplary, non-limited embodiment, implementations can include distributed processing, device/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    managing, by a processor, performance of a battery based on a current battery power level and a power requirement of a pre-boot operation, wherein the battery is configured as a sole source of power of an information handling system, wherein the managing of the performance of the battery is performed during an initialization of the information handling system;
    predicting whether the current battery power level is sufficient to complete the pre-boot operation based on the power requirement of the pre-boot operation associated with the initialization, wherein the predicting includes comparing the current battery power level with the power requirement of the pre-boot operation that includes an anticipated power consumption of a component associated with the pre-boot operation;
    if the current battery power level is sufficient to complete the pre-boot operation, then executing the pre-boot operation; and
    if the current battery power level is insufficient to complete the pre-boot operation, then providing one or more options associated with the pre-boot operation based on a power management policy, wherein the current battery power level is sufficient to execute the one or more options that includes putting another component that is not associated with the pre-boot operation into a low-power state.

2. The method of claim 1, further comprising subsequent to the executing the pre-boot operation, updating a configuration table based on an actual power consumption of the component and latest battery power level subsequent to the executing the pre-boot operation.

3. The method of claim 1, further comprising querying the anticipated power consumption of the component from a configuration table prior to the executing the pre-boot operation.

4. The method of claim 1, further comprising updating a configuration table with an actual power consumption of the component subsequent to the executing the pre-boot operation or executing the one or more options.

5. The method of claim 1, further comprising updating a low-power state table of the low-power state of the another component.

6. The method of claim 1, wherein the one or more options include switching from a graphical user interface mode to a command line interface mode.

7. The method of claim 1, wherein the one or more options include executing a subset of the pre-boot operation.

8. The method of claim 1, wherein the one or more options include exiting from the pre-boot operation.

9. The method of claim 1, further comprising configuring runtime properties of the information handling system prior to the executing the pre-boot operation or executing a subset of the pre-boot operation.

10. The method of claim 1, further comprising in response to the battery not charging when plugged to a power source, updating a firmware of the battery.

11. The method of claim 1, wherein the processor has a list of pre-boot operations to be executed in the information handling system, wherein each pre-boot operation of the pre-boot operations is associated with the anticipated power consumption of a plurality of components.

12. An information handling system, comprising:
    an embedded controller to capture a current battery power level of a battery that is a sole source of power of the information handling system; and
    a power management controller configured to:
        update a configuration table with anticipated power consumption associated with a component of the information handling system, wherein the anticipated power consumption is based on a pre-boot operation;
        predict whether the current battery power level is sufficient to complete the pre-boot operation, including comparing the current battery power level with the anticipated power consumption of the component;
        if the current battery power level is sufficient to complete the pre-boot operation, then to execute the pre-boot operation; and
        if the current battery power level is insufficient to complete the pre-boot operation, then to provide one or more options associated with the pre-boot operation based on a power management policy, wherein the current battery power level is sufficient to execute the one or more options, and wherein the one or more options includes putting another component not associated with the pre-boot operation into a low-power state prior to executing the one or more options.

13. The information handling system of claim 12, wherein the power management controller includes a unified extensible firmware interface service.

14. The information handling system of claim 12, wherein the power management controller includes an operating system service.

15. The information handling system of claim 12, the power management controller is further configured to update the configuration table with a latest battery power level subsequent to the execution of the pre-boot operation.

16. The information handling system of claim 12, wherein the power management controller is further configured to update the configuration table with an actual power consumption of the component subsequent to the execution of the pre-boot operation.

17. A non-transitory computer-readable medium including code that when executed causes a processor to perform a method, the method comprising:
monitoring performance of a battery based on a current battery power level, wherein the battery is configured as a sole source of power of an information handling system, wherein the monitoring of the performance of the battery is during an initialization of the information handling system;
predicting whether the current battery power level is sufficient to complete a pre-boot operation, including comparing the current battery power level with anticipated power consumption of a component associated with the pre-boot operation;
if the current battery power level is sufficient to complete the pre-boot operation, then executing the pre-boot operation; and
if the current battery power level is insufficient to complete the pre-boot operation, then providing one or more options associated with the pre-boot operation based on a power management policy, wherein the current battery power level is sufficient to execute the one or more options, and wherein the one or more options includes putting another component that is not associated with the pre-boot operation, into a low-power state prior to executing the one or more options.

18. The non-transitory computer-readable medium of claim 17, further comprising subsequent to the executing the pre-boot operation, updating a configuration information based on latest battery power level subsequent to the executing the pre-boot operation.

19. The non-transitory computer-readable medium of claim 17, wherein putting the another component into the low-power state includes updating a low-power state table.

20. The non-transitory computer-readable medium of claim 17, wherein the predicting whether the current battery power level is sufficient to complete the pre-boot operation is based on the power management policy.

* * * * *